Aug. 25, 1953 J. W. RICE 2,649,631
V BELT WITH IMPROVED FASTENER MEANS
Filed July 11, 1951

John W. Rice
INVENTOR.

BY *Clarence A. O'Brien*
and *Harvey B. Jacobson*
Attorneys

Patented Aug. 25, 1953

2,649,631

UNITED STATES PATENT OFFICE 2,649,631

V BELT WITH IMPROVED FASTENER MEANS

John W. Rice, Grand Prairie, Tex.

Application July 11, 1951, Serial No. 236,165

4 Claims. (Cl. 24—33)

The present invention relates to certain new and useful improvements in motion and power transmitting belts, generally speaking, and has more particular reference to so-called automotive V-belts, namely, fan belts, and has more specific reference to unique fastener means for joining the ends of a belt together.

These types of belts are usually of endless form and, as is well known, are difficult to apply and remove. As a general rule, special tools are needed to apply and remove such a belt, which poses a problem when the car owner or one not too handy attempts to do the job unaided. There has therefore existed a need for a belt which is susceptible of being installed, or later removed, by an average person. It follows, therefore, that the instant invention has to do with a belt whose ends are divided but are capable of being joined through the medium of easy-to-operate and reliable fastener means.

Another object of the invention is to improve upon belt fasteners in various lines of separable belt constructions and to, at the same time, provide a belt and fastener means therefor in which manufacturers, users and others will find their respective requirements and needs amply met and effectually available.

More specifically, the invention has to do, on the one hand, with a rubber or equivalent belt having embedded therein strengthening and reinforcing cords, said cords having looped ends so as to provide a multiplicity or set of loops at each end of the belt, said sets of loops projecting beyond the respective ends of the belt to accommodate the improved fastener means.

Then, too, novelty is predicated on the fastener means which not only joins the respective sets of loops but is possessed of the desired strength factors and flexible characteristics rendering the over-all construction such that it should enjoy widespread adoption, use and indorsement by all concerned.

Other objects and advantages will become more readily apparent from the following description and accompanying sheet of drawings.

In the accompanying sheet of drawings, wherein like numerals are employed to designate like parts throughout the views.

Figure 1:
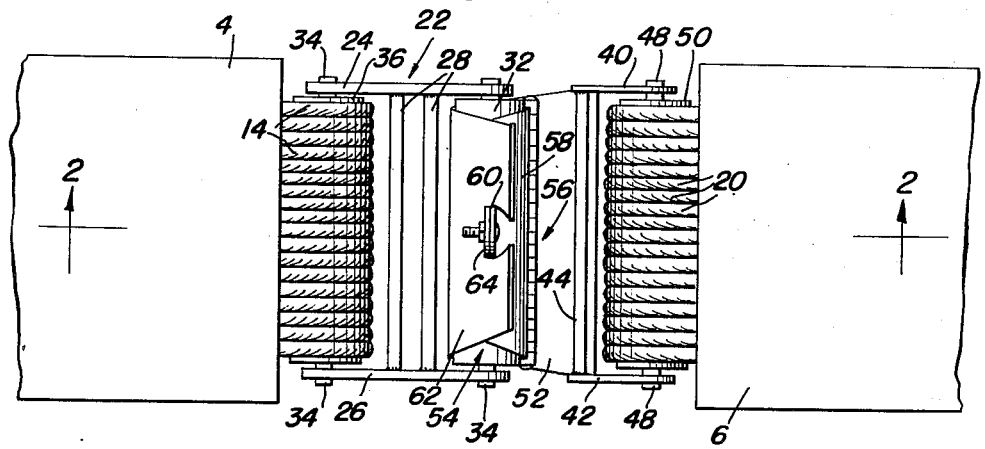
Figure 1 is a top plan view of a belt construction with the belt-ends fragmentarily shown and with the complete fastener means set and ready for use.
Figure 2:
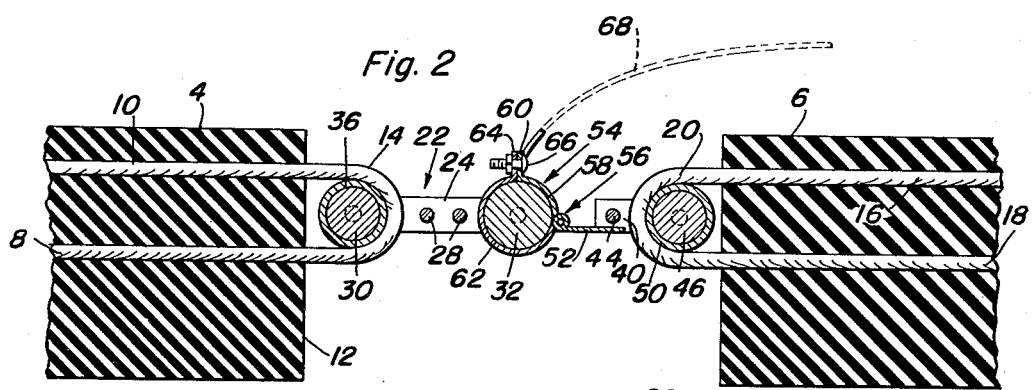
Figure 2 is a central longitudinal sectional view taken on the plane of the line 2—2 of Figure 1, looking in the direction of the arrows.

Reference may be conveniently had to Figures 1 to 2 wherein one free end of the belt is denoted at 4 and the other complemental end denoted at 6. It may be pointed out here that the belt may, of course, be a flat type or a type which is V-shaped in cross-section. Primarily, the invention is concerned with a fan belt which is usually referred to as a V-belt. Therefore, the belt is made of rubber or a combination of these materials and is especially characterized by a multiplicity of strengthening and reinforcing cords which are embedded in looped fashion in the body portion of the belt. The strands of one cord are seen in Figure 2 and these are denoted by the numerals 8 and 10. Each cord has a looped end of general U-shape form which is allowed to project beyond the adjacent end 12 of the belt, said loop being denoted by the numeral 14. There are any number of these loops and they are lined up to form a set of registering loops. The same is true insofar as the belt end 6 is concerned, and as shown in Figure 2 the runs or strands here are denoted by the numerals 16 and 18 and the loops, of corresponding form, denoted by the numerals 20. Here again, the series of loops are lined up to form a set of loops coacting with the loops 14. These respective sets of loops serve to accommodate the novel fastener means. Since the cords are the real "strength elements" in the over-all belt advantage is taken of this arrangement of projecting or exposing the loops to accommodate the fastener means. Consequently, a properly articulating and strong connection between the belt ends 4 and 6 is assured.

Figure 3:
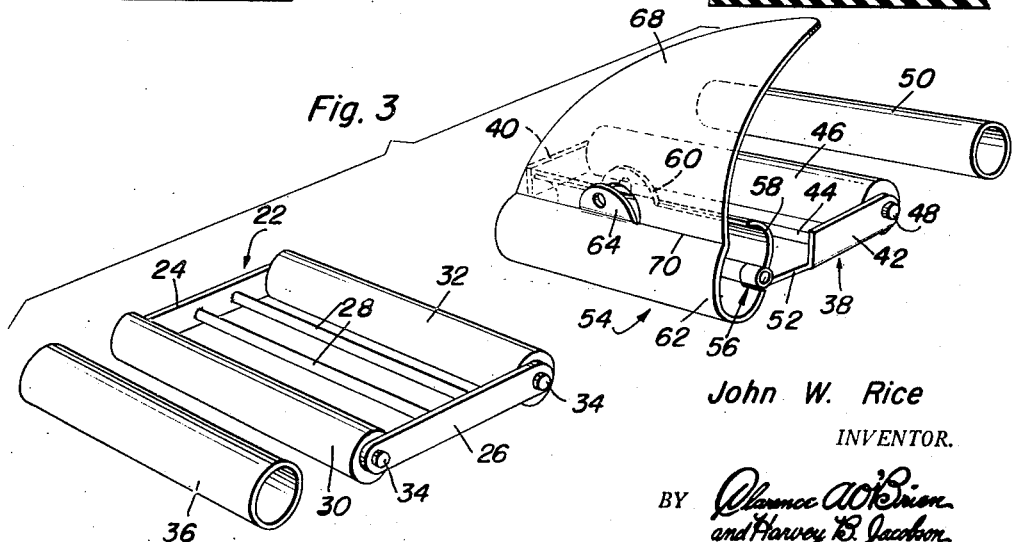
Figure 3 is a perspective view of an exploded type showing the details of construction of the fastener means with requisite particularity.

The fastener means may be treated as made up of a left hand unit and a right hand unit. Referring to Figure 3 the left hand unit comprises essentially a roller equipped frame 22. The frame members 24 and 26 are rigidly connected by tie-rods 28 disposed between companion rollers 30 and 32 respectively, said rollers having pintles or journals 34—34 operable in bearings provided therefor in the frame bars or members 24 and 26. There is a metal sleeve or jacket 36 rotatably mounted on and enclosing the roller 30 and this freely turnable sleeve roller is, of course, seated in the bight portions of the loops 14. Or to put it otherwise, the roller means is saddled in the loops 14.

The frame unit at the right in Figure 3, is denoted as an over-all assemblage by the numeral 38. This unit comprises a pair of frame members or flanges 40 and 42 disposed in spaced parallelism and joined by a single tie-rod 44. This frame unit also accommodates a roller 46 having suitably journaled pintles 48 mounted between the frame members 40 and 42. This roller also has a turnable covering sleeve 50. Plate means 52 is rigidly mounted between the frame members 40 and 42 and projects therebeyond and serves as a support for a conveniently usable coupling which may be generally referred to as a sectional buckle 54. The buckle is hingedly mounted at 56 on said plate means 52. The buckle embodies a quarter-leaf 58 having an attaching ear 60, and a complemental three-quarter leaf 62 having an ear 64. The two ears are adapted to be secured together by bolt and nut means 66. As plain from the drawings, the coupling roller 32 is adapted to be connected with said buckle 54. That is to say, the sections of the buckle embrace the roller and are then bolted together to provide the desired union of parts. Attention is called to the substantially triangular extension 68 which is carried by the buckle leaf 62. It is joined to the leaf by a perforated connection 70 as shown in Figure 3. This element 68 is a piloting tongue and its purpose is to enable the buckle means to be joined with the roller means 32 in a convenient manner. By this is meant that the tongue 68 may be slipped and fed around the roller 32 and then used as a pull-tab. By pulling on the then existing tab the roller 32 can be fed conveniently into the buckle and then the buckle closed and bolted. After this, since the tongue 68 has no further use, it may be rocked back and forth on the perforated or score line 70 and bodily detached and thrown away.

With the means 38 connected by a rubber covered roller with the loops 20 and the means 22 joined likewise with the loops 14, novel and practical fastener means is provided for readily joining the ends of the belt.

I believe this fastener will greatly advance the replacement fan belt business. It will also furnish a fastener (with modifications) for industrial applications that will prove invaluable where endless belts are not practical. The ideas which I believe are particularly new are the connecting of the actual strength section of the belt, the features providing easy installation, and the connector in general, which, with its many bearing surfaces and flexible points, should prove superior to any fastener now available. Present fasteners require different belt construction which is inherently inferior to the construction of endless belts. This fastener, therefore, should offer the advantages of the endless belt construction and the desirable features of an open-ended belt.

Minor changes in shape, size, materials and rearrangement of parts may be resorted to in actual practice provided no departure is made from the invention as claimed.

Having thus described the invention, what is claimed as new is:

1. For use in conjunction with an automotive power transmitting belt fabricated to include embedded reinforcing cords, the ends of the latter terminating in a multiplicity of U-shaped loops projecting beyond the respective ends of said belt; self-adapting flexible loop connecting belt-end fastener means comprising a roller adapted to be saddled in the projecting loops at one end of said belt, a second roller adapted to be saddled in the loops at the opposite end of said belt, and separable connecting means flexibly joining said rollers in spaced parallelism.

2. The structure defined in claim 1, wherein said connecting means embodies a third roller linked to said first named roller, and a two-part openable and closable buckle hinged to said second named roller, said buckle adapted to embrace said third roller.

3. For use in conjunction with an automotive power transmitting belt which is fabricated to include embedded reinforcing cords, the ends of the latter terminating in U-shaped loops projecting beyond the respective ends of said belt, and there being a multiplicity of extending loops for each end of said belt; self adapting fastener means for joining the belt-ends by way of the cooperating loops comprising a roller to be saddled in the loops at one end of said belt, a second roller to be saddled in the loops at the opposite end of said belt, a third roller, frame means hingedly connecting said third roller with said first roller, frame means hingedly connected with said second roller, and a two-part buckle hingedly mounted on said last named frame means, the parts of said buckle being adapted to completely embrace said third roller, said parts having fastening means.

4. The structure specified in claim 3 wherein one of the parts of said buckle is provided with a detachable piloting tongue to facilitate connecting said third roller with said buckle.

JOHN W. RICE.

References Cited in the file of this patent

UNITED STATES PATENTS

| Number | Name | Date |
|---|---|---|
| 1,706,354 | Geist | Mar. 19, 1929 |
| 2,446,311 | Traxler | Aug. 3, 1948 |

FOREIGN PATENTS

| Number | Country | Date |
|---|---|---|
| 48,754 | Switzerland | of 1909 |